(12) United States Patent
Ueno

(10) Patent No.: US 6,523,772 B2
(45) Date of Patent: Feb. 25, 2003

(54) ELECTRIC DEVICE WITH CORD RETAINER FOR BICYCLE

(75) Inventor: Koken Ueno, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/865,688

(22) Filed: May 29, 2001

(65) Prior Publication Data

US 2002/0179766 A1 Dec. 5, 2002

(51) Int. Cl.[7] .......................... B65H 75/42; H02G 3/00; B62J 39/00
(52) U.S. Cl. ................. 242/400.1; 191/12 R; 280/288.4
(58) Field of Search ............................. 242/400.1, 388, 242/388.1, 388.2, 388.5, 588.6; 191/12 R; 280/288.4

(56) References Cited

U.S. PATENT DOCUMENTS

| | | | | |
|---|---|---|---|---|
| 1,977,347 A | * | 10/1934 | Namet | 242/388 |
| 2,007,699 A | * | 7/1935 | Wiebking | 191/12 R |
| 2,118,731 A | * | 5/1938 | Knott | 191/12 R |
| 2,656,991 A | * | 10/1953 | Neely | 242/388.5 |
| 2,865,071 A | * | 12/1958 | Clemens | 242/388.1 |
| 4,143,557 A | | 3/1979 | Wakebe et al. | |
| 4,274,566 A | * | 6/1981 | Rowe | 280/288.4 |
| 4,490,127 A | | 12/1984 | Matsumoto et al. | |
| 4,846,343 A | * | 7/1989 | Rupert | 242/588.6 |
| 5,762,281 A | | 6/1998 | Foley | |
| 5,772,152 A | * | 6/1998 | Maldonado | 242/388.5 |
| 5,979,816 A | * | 11/1999 | Blankenship et al. | 242/400.1 |
| 6,065,708 A | * | 5/2000 | Matsubara | 242/388.1 |
| 6,082,656 A | | 7/2000 | Thornton | |
| 6,204,752 B1 | | 3/2001 | Kishimoto | |

* cited by examiner

Primary Examiner—John M. Jillions
(74) Attorney, Agent, or Firm—Shinjyu Global IP Counselors, LLP

(57) ABSTRACT

An electric device for a bicycle is provided that retains a cord to reduce or eliminate slack in the cord, which preferably extends between a pair of electric devices. At least one electric device includes a housing portion, a bobbin portion and a retainer portion. The bobbin portion extends from the housing portion and has a winding surface. The retainer portion is coupled to overlie a portion of the bobbin portion to retain an electrical cord on the winding surface of the bobbin portion. In one embodiment, the bobbin portion includes a pair of bobbin sections with the retainer portion releasably coupled to the housing portion. In another embodiment, the bobbin portion is a tubular member and the retainer portion is fixedly coupled to the housing portion.

28 Claims, 8 Drawing Sheets

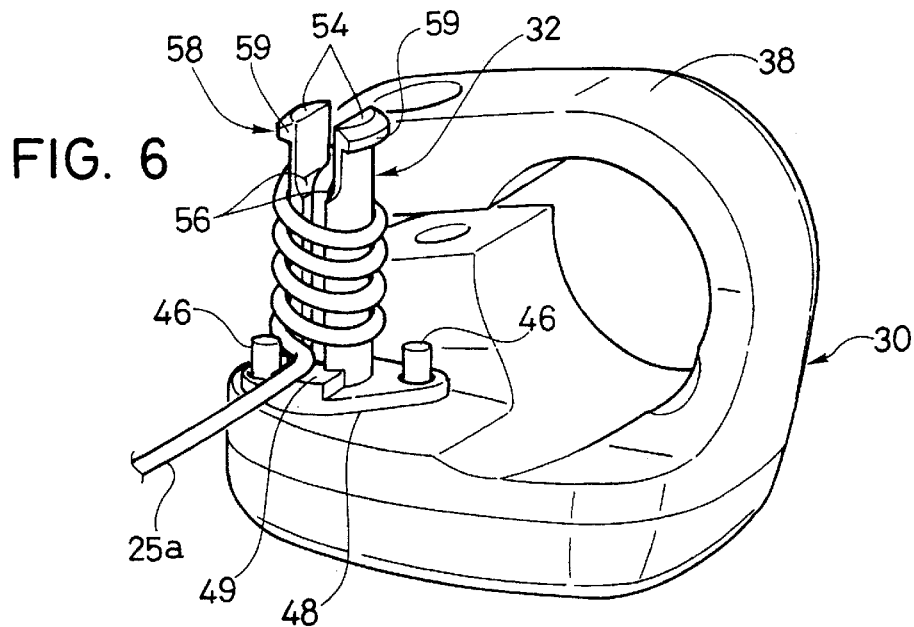
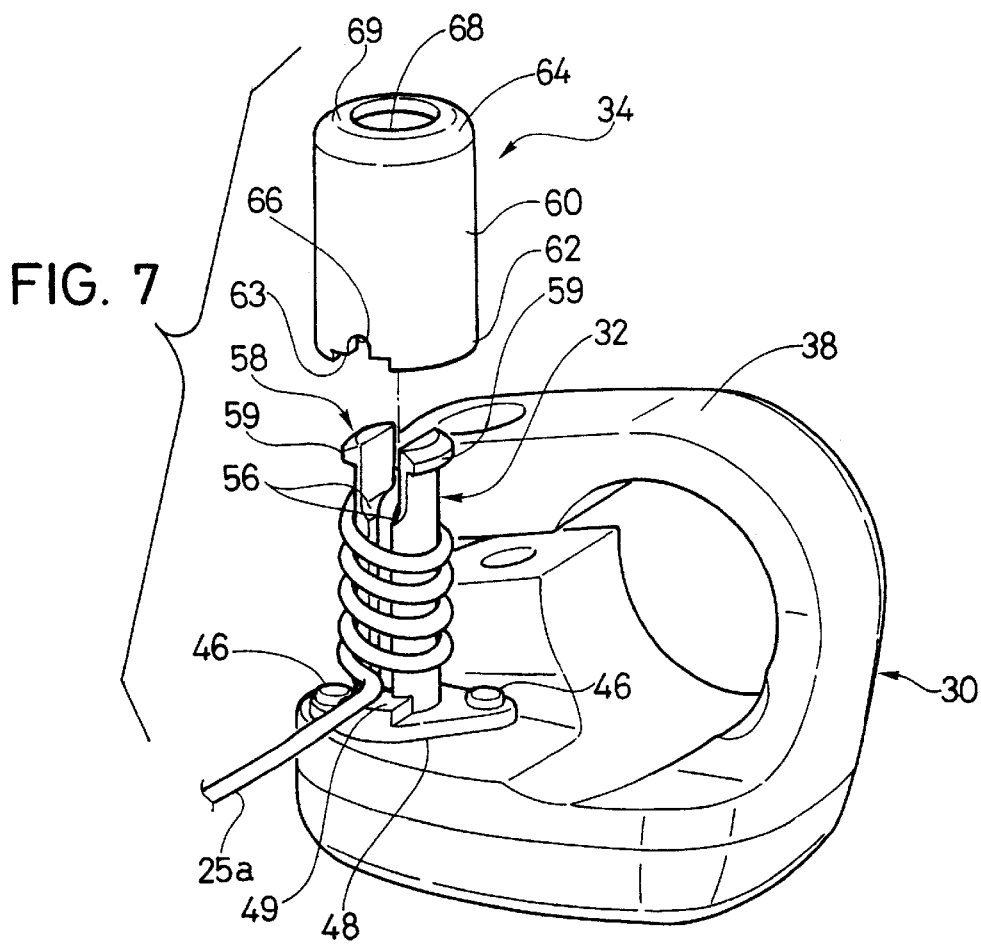

ELECTRIC DEVICE WITH CORD RETAINER FOR BICYCLE

BACKGROUND OF THE INVENTION

1. Field of the Invention

This invention generally relates to a corded electrical device for a bicycle. More specifically, the present invention relates to an electrical device with a cord retainer for a bicycle that attractively retains an excess length of a cord to reduce the effective length of the cord and reduce slack in the cord.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. Specifically, in recent years, bicycles have been provided with electric devices to improve rider efficiency and/or component control. For example, cycle computer systems including a main unit, one or more sensors, one or more control switches, and cords (wires) for electrical communication between the various parts have been utilized on bicycles in recent years to monitor and/or control various functions.

Typically, the various parts of these electric systems are connected by a network of cords or wires, which are designed to run along portions of the frame of the bicycle. Bicycle frames typically are constructed in a variety of sizes to accommodate riders of different heights. Moreover, bicycle frames are typically designed with a specific geometry for a specific riding situation. For example, bicycles frames can be designed for road-type riding, off-road riding, city or commuter type riding, or downhill riding. Thus, the cords (wires) of electric systems are typically designed to be sufficiently long so the electric device can be used on a variety of bicycle frame sizes and/or frame types.

When these electric systems are utilized on certain bicycle frames such as small bicycle frames, there can be excess cords (wires) extending between the various parts of the electric system. Typically, excess cords (wires) are wrapped around the bicycle frame or component control cables to take-up the slack or excess cord between parts of the electric system. Also, adhesive strips or plastic ties are sometimes utilized to retain or secure the cords (wires) to the frame. These adhesive strips and plastic ties can be cumbersome. Winding the cords around the bicycle frame or control cables can also be cumbersome. These prior systems and mounting methods can create difficulty in installing certain parts of these electric systems on the bicycle. Moreover, it can be difficult to remove or reduce the slack in the cords (wires) during installation of these electric systems. Slack in the cords (wires) can allow the cords (wires) to catch on obstructions such as brush in off-road riding, the cyclist's clothing, etc. Finally, these prior electric systems can have an unattractive appearance when installed on certain bicycle frames.

In view of the above, there exists a need for an electrical device with a cord retainer for a bicycle, which overcomes the above-mentioned problems in the prior art. This invention addresses this need in the prior art as well as other needs, which will become apparent to those skilled in the art from this disclosure.

SUMMARY OF THE INVENTION

One object of the present invention is to provide an electrical device with a cord retainer that eliminates or reduces cord slack or excess cord.

Another object of the present invention is to provide an electrical device with a cord retainer that is relatively simple and inexpensive to manufacture and assemble.

Another object of the present invention is to provide an electrical device with a cord retainer that eliminates or reduces the need to wind cords around the bicycle frame or control cables.

Still another object of the present invention is to provide an electrical device with a cord retainer that has an attractive, clean appearance.

The foregoing objects can basically be attained by providing an electric device for a bicycle that comprises a housing portion, a bobbin portion and a retainer portion. The bobbin portion extends from the housing portion and has a winding surface. The retainer portion is coupled to overlie a portion of the bobbin portion to retain an electrical cord on the winding surface of the bobbin portion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 6 is an enlarged, reverse perspective view of the electric device illustrated in FIG. 4, prior to fixedly coupling the bobbin portion to the housing portion and with the retainer portion removed for purposes of illustration;

FIG. 7 is an enlarged, partially exploded, reverse perspective view of the electric device-illustrated in FIG. 4, after fixedly coupling the bobbin portion to the housing portion for purposes of illustration;

DETAILED DESCRIPTION OF THE PREFERRED EMBODIMENTS

Figure 1:
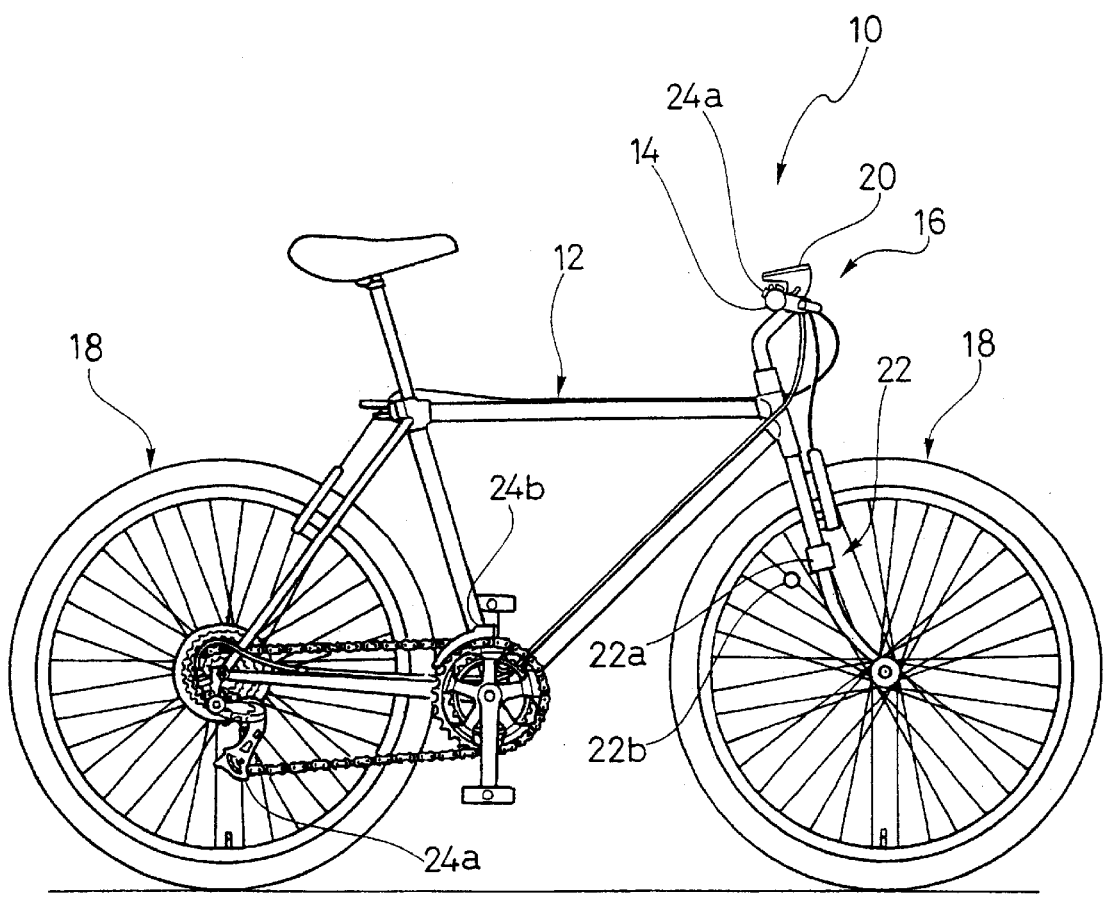
FIG. 1 is a side elevational view of a bicycle with an electronically controlled drive train in accordance with a preferred embodiment of the present invention.
Figure 2:
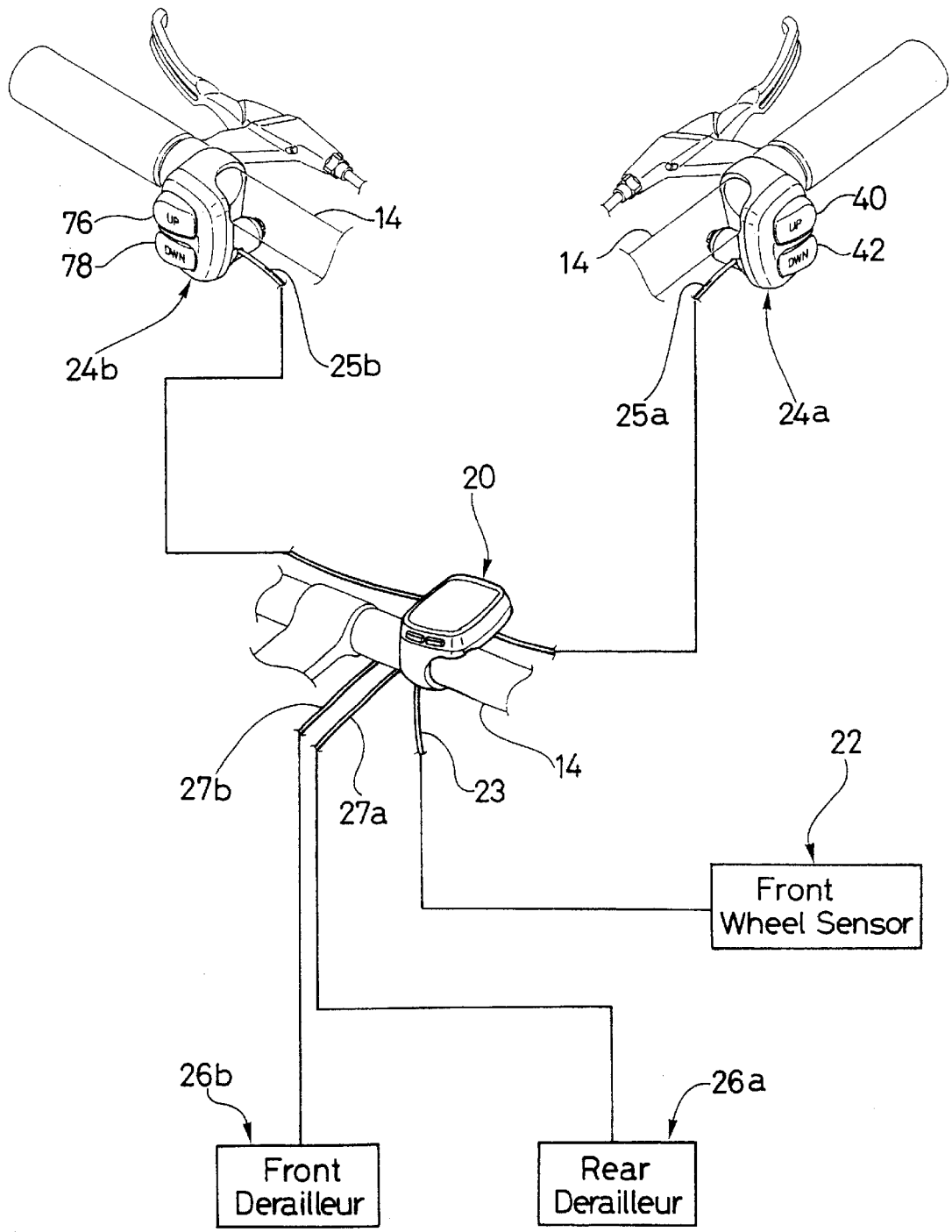
FIG. 2 is a partially schematic view of the electronically controlled drive train of the bicycle illustrated in FIG. 1.
Figure 3:
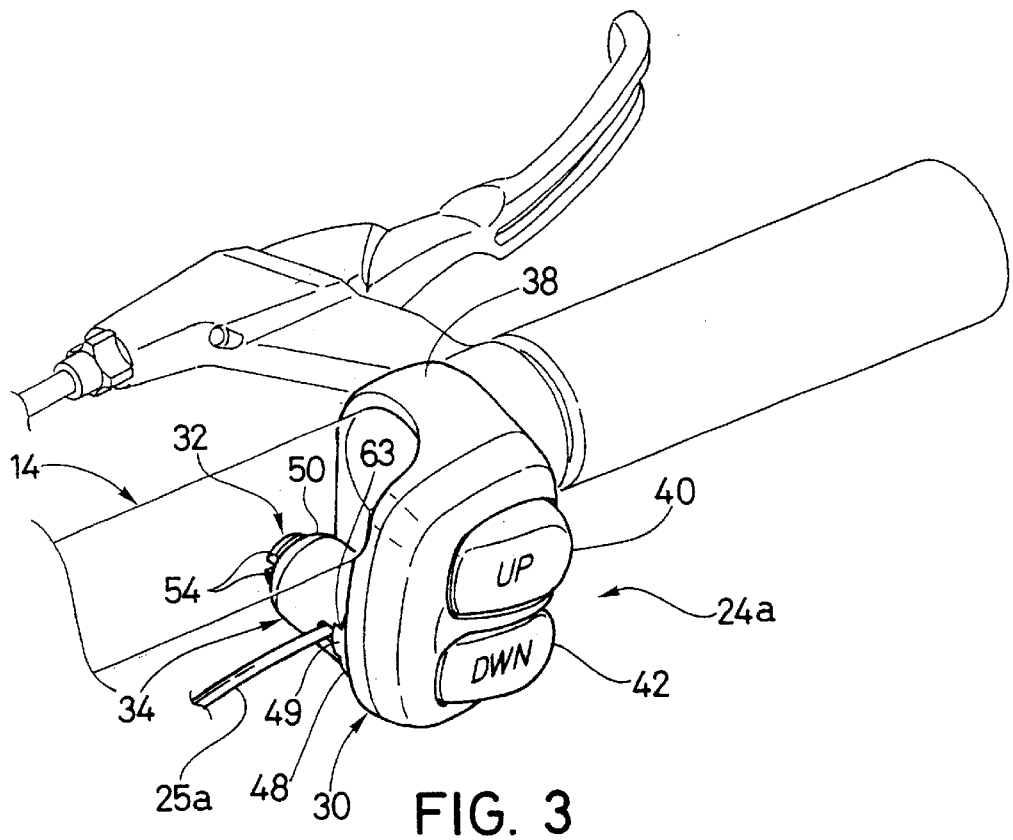
FIG. 3 is an enlarged perspective view an electric device (rear shifting device) mounted on a portion of the handlebar of the bicycle illustrated in FIG. 1.
Figure 4:
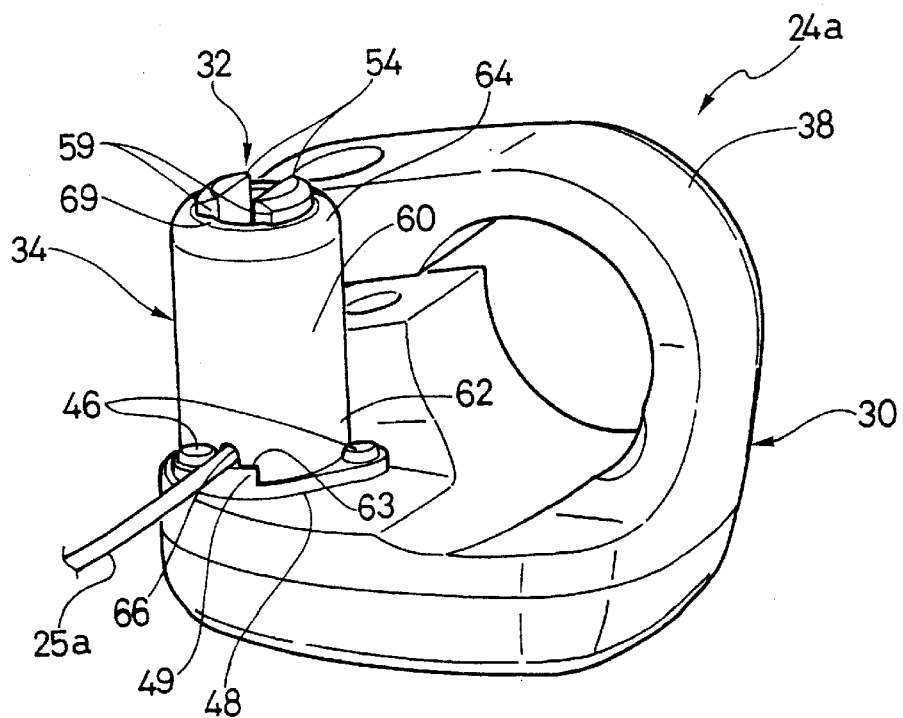
FIG. 4 is an enlarged, reverse perspective view of the electric device illustrated in FIG. 3, with the electric device removed from the handlebar.

Referring initially to FIGS. 1 and 2, an electronically operated bicycle 10 is illustrated to explain the present invention. The present invention relates to the connections of cords or wires between the electric devices of the bicycle 10. More specifically, the present invention relates to an electric device with a cord retainer. The bicycle 10 and its various components are well known in the prior art, except for the cord retainer of the electrical devices. Thus, the bicycle 10 and its various components will not be discussed or illustrated in detail herein, except for the components that relate to the present invention. Moreover, various conventional bicycle parts such as brakes, or drive trains, etc., which are not illustrated and/or discussed in detail herein, can be used in conjunction with the present invention. Furthermore, it will be apparent to those skilled in the art that the present invention could be utilized to connect various other electric devices of the bicycle 10 as needed and/or desired.

Basically, the bicycle 10 has a frame 12, a handlebar 14, an electronically controlled drive train 16 and a pair of wheels 18 coupled to the frame 12. The electronically controlled drive train 16 includes a cycle computer 20, a sensor 22, a pair of electronic shifting devices 24a (rear) and 24b (front) and a pair of motorized derailleurs 26a (rear) and 26b (front). In other words, the drive train 16 includes a plurality of electric devices. The electronically controlled drive train 16 is operated by the electronic shifting devices 24a and 24b and/or the cycle computer 20 in a conventional manner, as discussed below in more detail.

The bicycle 10 can be equipped with other electronically controlled components such as front and/or rear suspensions, which utilize cord retainers in accordance with the present invention. Moreover, bicycle 10 could be equipped with fewer electric devices than in the illustrated embodiment. For example, bicycle 10 could utilize only a cycle computer and sensor to monitor various parameters. In other words, it will be apparent to those skilled in the art from this disclosure that the present invention could be utilized with other electric devices for the bicycle 10 as needed and/or desired, and could be utilized with more/fewer electric devices than illustrated herein as needed and/or desired.

The various electrical devices (the cycle computer 20, the front wheel sensor 22, the electronic shifting devices 24a and 24b and the derailleurs 26a and 26b, etc.) of the bicycle 10 are electrically coupled together by electrical cords or wires in a relatively conventional manner. More specifically, cycle computer 20 is electrically coupled to the front wheel sensor 22 via a cord 23, while the electronic shifting devices 24a and 24b are electrically coupled to the cycle computer 20 via the electrical cords 25a and 25b, respectively. The motorized derailleurs 26a and 26b (i.e. rear and front derailleurs, respectively) are preferably electrically coupled to the cycle computer 20 via the electrical cords 27a and 27b, respectively.

Motorized derailleurs are well known in the art. Thus, the motorized derailleurs 26a and 26b (i.e. rear and front derailleurs, respectively) will not be discussed or illustrated in detail herein. Of course, one or more of the electrical devices could be eliminated as needed and or desired. For example, the front wheel sensor 22 could be eliminated if desired. However, the bicycle 10 preferably includes at least a pair of electric devices with at least one of the electric devices (the cycle computer 20, the front wheel sensor 22, the electronic shifting devices 24a and 24b and the derailleurs 26a and 26b, etc.) including a cord retainer in accordance with the present invention.

Referring to FIGS. 3–7, the electronic shifting device 24a is a rear shifting device that basically includes a housing portion 30, a bobbin portion 32 and a retainer portion 34. The bobbin portion 32 and the retainer portion 34 form a cord retainer. The bobbin portion 32 extends from the housing portion 30, and includes a winding surface 36. The retainer portion 34 is coupled to overlie a portion of the bobbin portion 32 to retain the electrical cord 25a on the winding surface 36 of the bobbin portion 32. The cord 25a is fixedly coupled to the housing portion 30 within a hollow interior area of the housing portion 30. The housing portion 30 preferably includes a clamping portion 38 configured to mount the housing portion 30 on handlebar 14. The housing portion 30 also includes a pair of shift control buttons 40 and 42, discussed in more detail below.

The housing portion 30 is preferably formed of lightweight, rigid material such as molded plastic. Of course, the housing portion 30 could be formed of any suitable material known in the art as needed and/or desired. Moreover, the housing portion 30 could be formed of several parts coupled together as needed and/or desired. Preferably, the housing portion 30 is formed of at least two pieces coupled together, or is formed as one-piece and includes an access opening. Thus, the various electrical contacts and the shift buttons 40 and 42 can be installed and connected together in a conventional manner.

The clamping portion 38 is preferably a tubular clamping portion designed to be clamped to the handlebar 14 with a threaded fastener in a conventional manner. In the illustrated embodiment, the clamping portion 38 is integrally formed with the housing portion 30 (or at least a part of the housing portion 30) as a one-piece unitary member. However, it will be apparent to those skilled in the art from this disclosure that the clamping member 38 could be a separate member such that a housing could be releasably coupled thereto in a conventional manner if needed and/or desired. Furthermore, it will be apparent to those skilled in the art that depending on the type of electrical device (and the mounting method of the electrical device), the clamping portion could be eliminated. For example, the present invention could be utilized on a rear derailleur, which does not have a clamping member.

As mentioned above, the cord 25a is fixedly coupled to the housing portion 30. Specifically, the cord 25a is electrically coupled to the shift control buttons 40 and 42 and/or an electronic printed circuit board (not shown). Additionally, the cord 25a is mechanically coupled to the housing portion 30 within a hollow interior space (not shown) of the housing portion 30. In other words, the cord 25a is fixedly coupled (i.e. both mechanically and electrically) to the housing portion 30. The cord 25a extends from a cord opening 44 of the housing portion 30. The cord opening 44 is positioned such that the cord 25a can be curled around the winding surface 36 of the bobbin portion 32, as discussed in more detail below. In the illustrated embodiment, the housing portion includes a pair of protrusions 46 extending outwardly from opposite sides of the cord opening 44. The protrusions are preferably formed of heat deformable plastic material in order to rivet (or fixedly couple) the bobbin portion 32 to the housing portion 30. This type of plastic riveting is well known in the art.

Figure 5:
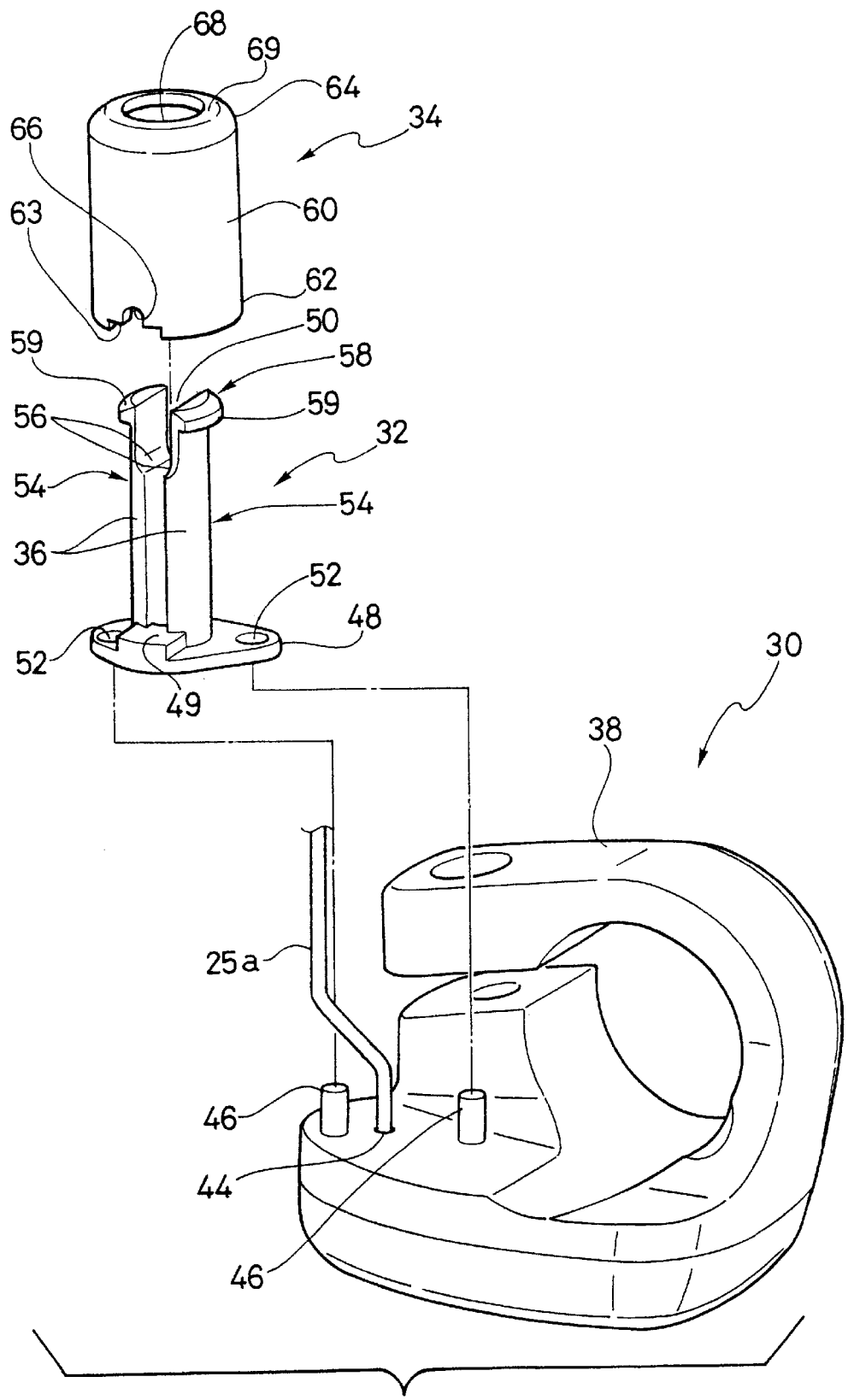
FIG. 5 is an exploded view of the electric device illustrated in FIG. 4.

In other words, the bobbin portion 32 is first mounted on the protrusions 46. Then, the ends of the protrusions 46 are deformed in order to fixedly couple the bobbin portion 32 to the housing portion, as best seen in FIGS. 5–7. In the illustrated embodiment, the protrusions (rivets) 46 are preferably integrally formed with the housing portion 30 (or a part of the housing portion 30) as a one-piece, unitary member. However, it will be apparent to those skilled in the art that protrusions 46 could be separate members and could be formed of other materials such as metallic material (i.e. conventional metal rivets) if needed and/or desired. Moreover, it will be apparent to those skilled in the art that other conventional fasteners such as bolts could be utilized to releasably couple the bobbin portion 32 to the housing portion 30 as needed and/or desired. Furthermore, it will be apparent to those skilled in the art that the bobbin portion 32 could be integrally formed with the housing portion 30 (or a part of the housing portion 30) as a one-piece unitary member as needed and/or desired. In any event, the bobbin portion 32 is preferably fixedly coupled to the housing portion 30.

Referring to FIGS. 5–7, the bobbin portion 32 is also preferably formed of lightweight, rigid material such as molded plastic. Of course, the bobbin portion 32 could be formed of any suitable material known in the art as needed and/or desired. In any event, the bobbin portion 32 has a limited degree of flexibility to aid in mounting retainer portion 34 thereto, as discussed in more detail below. The bobbin portion 32 is preferably formed as a one-piece unitary member separate from the housing portion 30. Of course, the bobbin portion 32 could be formed of several pieces and/or be integrally formed with the housing portion 30, as mentioned above. In any event, the bobbin portion 32 is preferably fixedly coupled to the housing portion 30.

The bobbin portion 32 includes a mounting plate or fixed end 48 and a free end 50 with the winding surface 36 arranged therebetween. The mounting plate 48 includes a pair of holes 52 sized to receive the protrusions 46 (rivets) therethrough. Preferably, the bobbin portion 32 includes a pair of bobbin sections 54 spaced from each other and extending in a longitudinal direction from the mounting plate 48 to form a cord receiving space therebetween. Moreover, the mounting plate 48 preferably includes a transverse slot, which allows the cord 25a to extend into the cord receiving space between the bobbin sections 54 (from the cord opening 44).

The bobbin portion 32 preferably includes an alignment member 49 designed to mate with a portion of the retainer member. Specifically, the mounting plate 48 (fixed end) of the bobbin portion 32 preferably includes the alignment member 49. In the illustrated embodiment, the alignment member 49 is a projection designed to mate with a portion of the retainer portion 34 to orient the retainer portion relative to the bobbin portion 32. Of course, it will be apparent to those skilled in the art that the housing portion 30 could include the alignment member if needed and/or desired. In any event, one of the bobbin portion 32 and the housing portion 30 has an alignment member.

Each bobbin section 54 includes a curved outer winding section that forms a portion of the winding surface 36 and a substantially flat inner surface. The substantially flat inner surfaces of the bobbin sections 54 are spaced from each other such that each bobbin section 54 has a cross-sectional shape of a truncated semicircle. In other words, each bobbin section 54 has an arced outer surface with an angular length of less than 180°. Thus, the cord receiving space is formed between the bobbin sections 54. Each of the bobbin sections 54 includes an abutment surface 56 adapted to engage part of the cord 25a. More specifically, each of the substantially flat surfaces of the bobbin sections 54 includes a recessed section adjacent the respective free ends of the bobbin sections 54 to form the abutment surfaces 56 to retain the cord 25a prior to winding the cord 25a around the winding surface 36. The abutment surfaces 56 are spaced from the free ends of bobbin sections 54.

When the bobbin portion 32 is coupled to the housing portion 30, the slot of the mounting plate 48 and the cord receiving space are first aligned with the cord opening 44 (and the cord 25a). The bobbin portion 32 is then moved toward the housing portion 30 such that protrusions 46 extend through the holes 52. The free ends of protrusions 46 are then deformed (as a rivet) to fixedly couple the bobbin portion 32 to the housing portion 30, as seen in FIGS. 6 and 7. The arrangement of the protrusions 46 and the holes 52 orients the bobbin portion 32 relative to the housing portion 30. Additionally, when the mounting plate 48 of the bobbin portion 32 is fixedly coupled to the housing portion 30, the cord opening 44 is located between the bobbin sections 54 and is substantially aligned with the cord receiving space between the bobbin sections 54.

The bobbin portion 32 preferably includes a first fastening part 58 designed to releasable couple the retainer portion 34 to the bobbin portion 32. Preferably, the bobbin portion 32 includes two hooks 59 formed at the free end 50 of the bobbin portion 32, which form the first fastening part 58. Specifically, each bobbin section 54 preferably has one of the hooks 59 formed at the free end thereof. Each of the hooks 59 preferably has a tapered end surface to aid in mounting retaining portion 34 on the bobbin portion 32. More specifically, each bobbin section 54 is preferably slightly elastically deformable (or has limited flexibility and resiliency) such that the free ends of the bobbin sections 54 with the hooks 59 are movable toward each other to releasably engage the retainer portion 34, as discussed below in more detail. In any event, the fastening part 58 of the bobbin portion 32 preferably includes at least one hook that engages the retainer portion 34.

Still referring to FIGS. 4–7, the retainer portion 34 preferably includes a tubular part 60 that encircles the winding surface 36 of the bobbin portion 32. The tubular part is preferably a separate member from the bobbin portion 32 and the housing portion 30, and includes first and second open ends 62 and 64, respectively. The retainer portion 34 is also preferably formed of lightweight, rigid material such as molded plastic. Of course, the retainer portion 34 could be formed of any suitable material known in the art as needed and/or desired. In any event, the retainer portion 34 has a limited amount of flexibility to aid in mounting the retainer portion 34 on the bobbin portion 32.

The first open end 62 is designed to be arranged adjacent the housing portion 30. Specifically, the first open end 62 preferably includes an alignment member 63 designed to mate with the alignment member 49 of the bobbin portion 32. More specifically, the alignment member 63 is preferably a notch designed to mate with the projection of the alignment member 49 of the bobbin portion 32 to orient the relative rotational position of the retainer portion 34 relative to the bobbin portion 32, as mentioned above. Preferably, a cord recess 66 is formed adjacent the first open end 62. The cord recess 66 preferably extends axially or longitudinally outwardly from the alignment member 63, and is configured to receive the cord 25a therethrough (after the cord 25a is wrapped around the winding surface 36).

The second open end 64 of the retainer portion 34 preferably includes a second fastening part 68 designed to mate with the first fastening part 58 of the bobbin portion 32. The second fastening part 68 includes a radially inwardly extending annular flange with an outwardly, axially facing engagement surface 69. The first and second fastening parts 58 and 68 preferably mate to form a snap-fit connection therebetween. More specifically, the pair of hooks 59 of the first fastening part 58 preferably releasably engage the engagement surface 69 of the second fastening part 68 to form the snap-fit connection.

Figure 8:
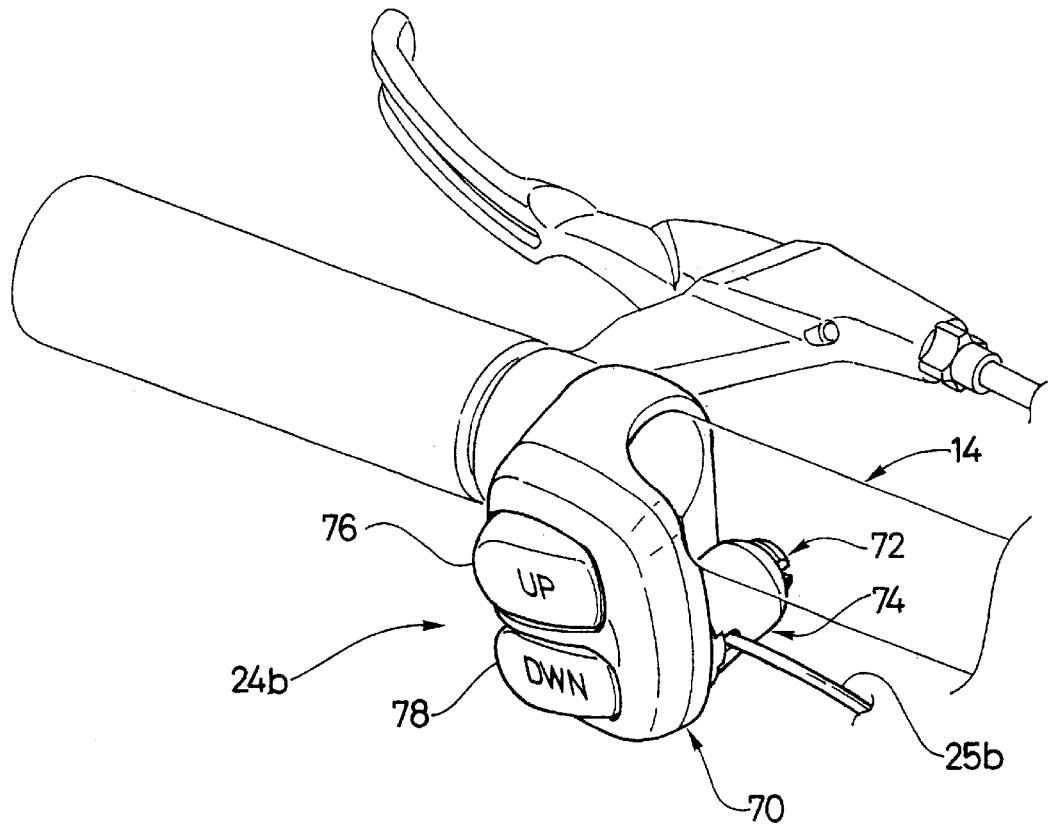
FIG. 8 is an enlarged perspective view an alternate electric device (front shifting device) mounted on an alternate portion of the handlebar of the bicycle illustrated in FIG. 1.

Referring to FIG. 8, the front electronic shifting device 24b is illustrated in accordance with the present invention. The front electronic shifting device 24b is identical to the rear electronic shifting device 24a, discussed above, except the front electronic shifting device 24b is a mirror image of the rear electronic shifting device 24a. Thus, the front electronic shifting device 24b will not be discussed or illustrated in detail herein. Rather, it will be apparent to those skilled in the art that the description of the rear electronic shifting device 24a also applies to the front electronic shifting device 24b. Basically, the front electronic shifting device 24b includes a housing portion 70, a bobbin portion 72 and a retainer portion 74. The front electronic shifting device 24b also includes a pair of shift buttons 76 and 78. The housing portion 70 and the bobbin portion 72 are identical to the housing portion 30 and the bobbin portion 32, respectively, except they are mirror images of each other. The retainer portion 74 is identical to the retainer portion 34.

Referring again to FIGS. 1 and 2, the cycle computer 20 preferably includes a microcomputer formed on a printed circuit board that is powered by a battery unit. The microcomputer of the cycle computer 20 includes a central processing unit (CPU), a random access memory component (RAM), a read only memory component (ROM), and an I/O interface. The various components of the microcomputer are well known in the bicycle field. Therefore, the components used in the microcomputer of the cycle computer 20 will not be discussed or illustrated in detail herein. Rather, it will be apparent to those skilled in the art from this disclosure that the cycle computer 20 can include various electronic components, circuitry and mechanical components to carryout the present invention. Moreover, it will be apparent to those skilled in the art from this disclosure that the cycle computer 20 can have a variety of configurations, as needed and/or desired. Thus, the cycle computer 20 functions as a shift control unit in the illustrated embodiment.

Preferably, the cycle computer 20 provides or displays various information to the rider via a display and together with the electronic shifting devices 24a and 24b controls or operates the motorized derailleurs 26a and 26b based on input from the rider and/or input from the sensor 22. In the illustrated embodiment, the cycle computer 20 includes a power supply or battery unit to operate the motorized derailleurs 26a and 26b. However, it will be apparent to those skilled in the art that a separate power supply could be utilized if needed and/or desired. Moreover, it will be apparent to those skilled in the art that each motorized derailleur 26a and 26b could each include a separate electric power supply, as needed and or desired.

Referring again to FIG. 1, the sensor 22 is preferably a front wheel speed sensing unit that includes a sensing portion 22a and a magnet 22b. The sensing portion 22a is preferably a magnetically operable sensor that is mounted on the front fork of the bicycle 10 and senses the magnet 22b that is attached to one of the spokes of the front wheel 18 of the bicycle 10. In the illustrated embodiment, the sensing portion 22a includes a reed switch for detecting the magnet 22b. The sensor 22 generates a pulse each time wheel 18 of the bicycle 10 has turned a prescribed angle or rotation. The sensor 22 outputs a bicycle speed signal to the computer 20 by detecting magnet 22b mounted on front wheel 18 of the bicycle 10. In other words, the sensor 22 detects the rotational velocity of the front wheel 18 of the bicycle 10. The sensor 22 can be utilized to simply display information to the rider, or can supply information to the cycle computer to control the motorized derailleurs 26a and 26b.

For example, in a manual mode, shifting of each of the motorized derailleurs 26a and 26b is performed manually via the electronic shifting devices 24a and 24b (shift buttons 40, 42, 76 and 78), respectively. The shifting devices 24a and 24b illustrated herein utilize down and up shift buttons 40, 42, 76 and 78. However, it will be apparent to those skilled in the art from this disclosure that various other types of shifting devices can used, such as levers, without departing from the scope of the invention. Depressing one of the shift buttons of the shifting devices 24a and 24b generates a predetermined operational command that is received by the central processing unit of the cycle computer 20. The central processing unit of the cycle computer 20 then sends a predetermined operational command or electrical signal to move or shifting one of the motorized derailleurs 26a and 26b.

In an automatic mode, shifting of each of the motorized derailleurs 26a and 26b is preferably at least partially based on the speed of the bicycle 10. Thus, the cycle computer 20 further includes at least one sensing/measuring device or component that provides information indicative of the speed of the bicycle 10 to its central processing unit of the cycle computer 20. In the illustrated embodiment, the sensor 22 generates a predetermined operational command indicative of the speed of the bicycle 10. Of course, additional sensing/measuring components can be operatively coupled to central processing unit of the cycle computer 20 such that predetermined operational commands are received by the central processing unit (CPU) to operate the motorized derailleurs 26a and 26b, or other components as needed and/or desired.

Figure 9:
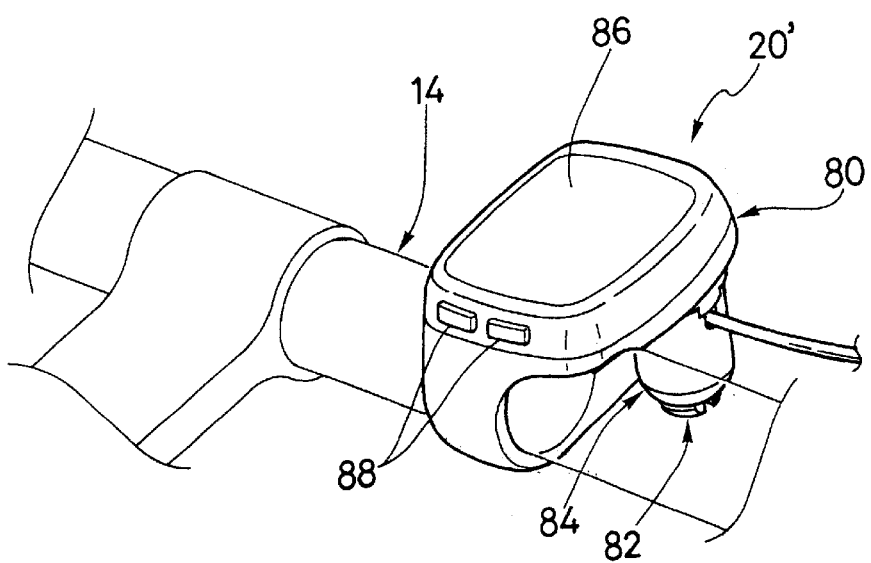
FIG. 9 is an enlarged perspective view another alternate electric device (modified cycle computer) mounted on a center portion of the handlebar.

Referring now to FIG. 9, a modified cycle computer 20' is illustrated in accordance with the present invention. The cycle computer 20' is identical to cycle computer 20, except that the cycle computer 20' includes a cord retainer in accordance with the present invention. In other words, cycle computer 20' is designed to be used with an electric device (not shown) that may not include a cord retainer. For example, the cycle computer 20' could be used with a cadence sensor. Specifically, the cycle computer 20' includes a housing portion 80, a bobbin portion 82 and a retainer portion 84. The bobbin portion 82 and the retainer portion 84 are identical to the bobbin portion 72 and the retainer portion 74 of the front electronic shifting device 24b. Thus, the bobbin portion 82 and the retainer portion 84 will not be discussed in detail herein. The housing portion 80 is substantially identical to the housing portion 70, except that the housing portion 80 is designed to be used as the cycle computer 20'. More specifically, the housing portion 80 includes a display 86, and a pair of control buttons 88, in a conventional manner. The shift buttons 76 and 78 of the housing portion 70 have been eliminated. The bobbin portion 82 and the retainer portion 84 are mounted to the housing portion 80 in a manner identical to the electronic shifting devices 24a and 24b.

Second Embodiment

Figure 10:
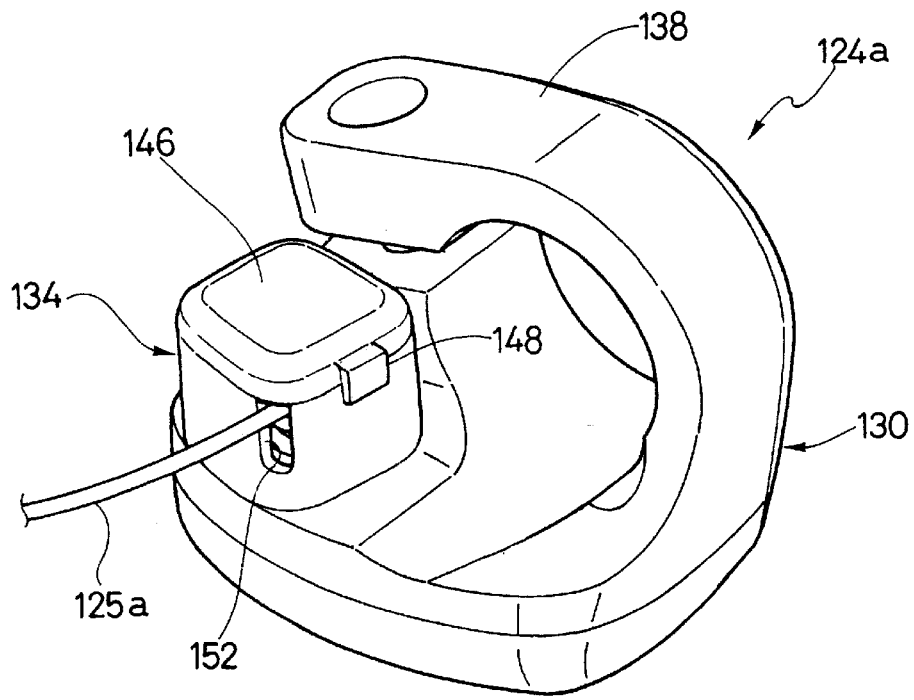
FIG. 10 is an enlarged, reverse perspective view of an electric device (rear shifting device) in accordance with a second embodiment of the present invention.
Figure 11:
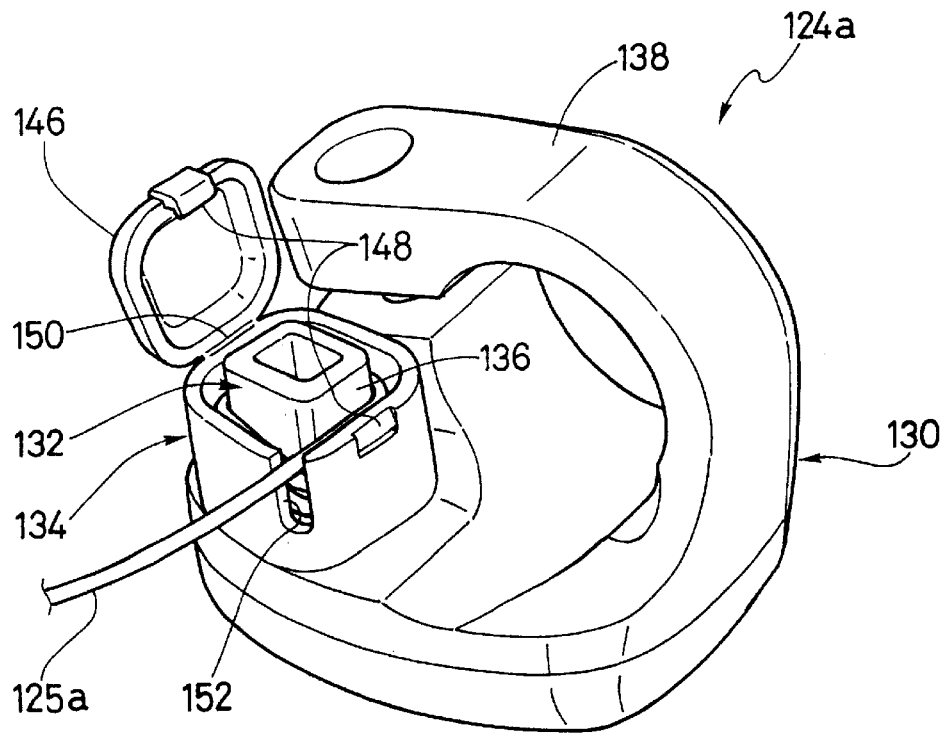
FIG. 11 is an enlarged, reverse perspective view of the electric device illustrated in FIG. 10, with the lid released for the purpose of illustration.
Figure 12:
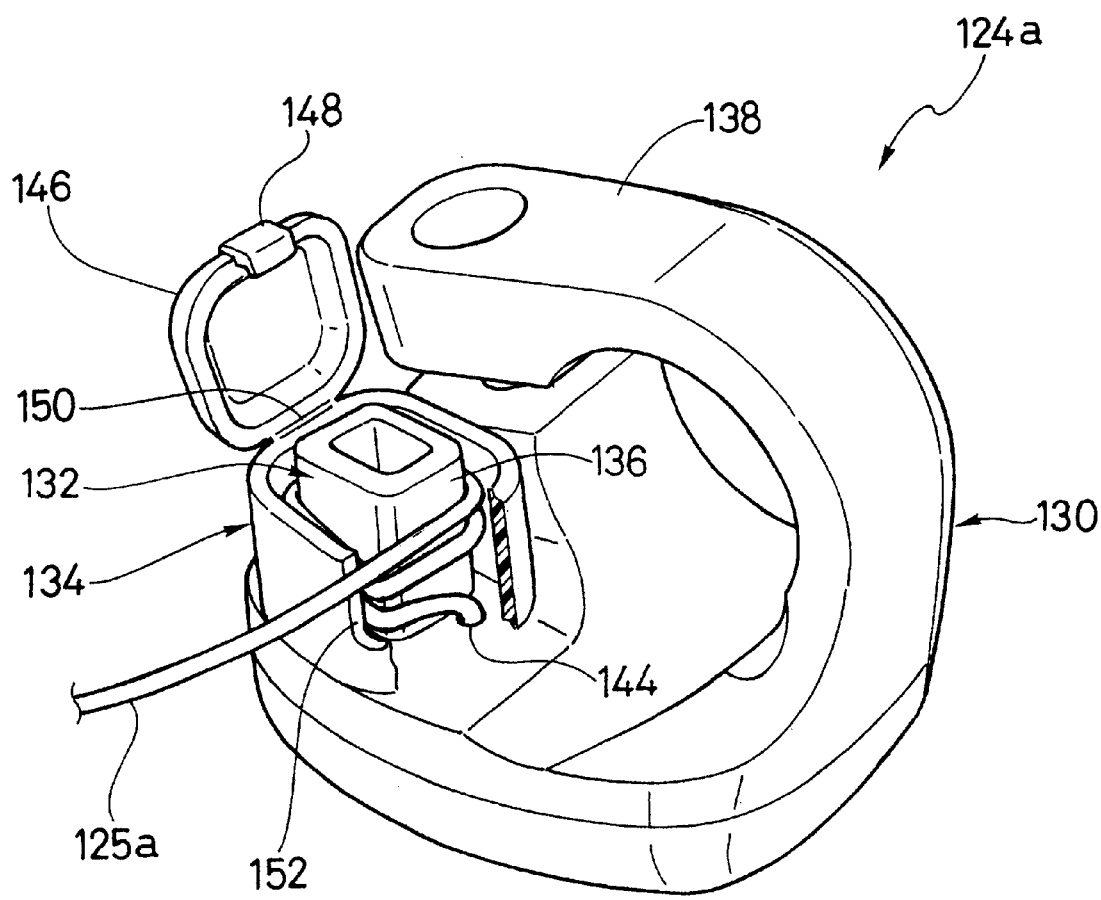
FIG. 12 is an enlarged, reverse perspective view of the electric device illustrated in FIG. 1, with portions broken away for the purpose of illustration.

Referring to FIGS. 10–12, an electric (rear) shifting device 124a is illustrated in accordance with a second-embodiment of the present invention. Of course, it will be apparent to those skilled in the art from this disclosure that the principles of this second embodiment could be applied to other electrical devices as needed and/or desired. For example, this second embodiment could be applied to a front electronic shifting device, a cycle computer or any other electric device as needed and/or desired.

The electronic shifting device 124a includes a housing portion 130, a bobbin portion 132 and a retainer portion 134 that form a cord retainer. The bobbin portion 132 extends from the housing portion 130 and includes a winding surface 136. The retainer portion 134 is coupled to overlie a portion of the bobbin portion 132 to retain an electrical cord 125a on the winding surface 136 of the bobbin portion 132. The housing portion 130 preferably includes a clamping portion 138 designed to mount the housing portion 130 on the handlebar 14. The housing portion 130 also includes a pair of shift control buttons (not shown).

In this embodiment, the bobbin portion 132 and the retainer portion 134 are preferably integrally formed with the housing portion 130 as a one-piece unitary member. The housing portion 130 is preferably formed of lightweight, rigid material such as molded plastic. Of course, the housing portion 130 could be formed of any suitable material known in the art as needed and/or desired. Moreover, the housing portion 130 could be formed of several parts coupled together as needed and/or desired. In any event, in this embodiment, the bobbin portion 132 and the retainer portion 134 are preferably fixedly coupled with the housing portion 130. In other words, the retainer portion 134 is not releasable.

The bobbin portion 132 includes a tubular bobbin section. The winding surface 136 is formed on the external surface of the tubular bobbin section. The housing portion 130 has a cord opening 144 located between said tubular bobbin section and the retainer portion 134, as best seen in FIG. 12.

The retainer portion 134 includes a tubular part that encircles the winding surface of the bobbin portion 132. A lid part 146 is preferably releasably coupled to the tubular part of the retainer portion 134. A latch 148 is formed between the lid part 146 of the retainer portion 134 and an open free end of the tubular part of the retainer portion 134. A living hinge 150 is formed between the lid part 146 of the retainer portion 134 and the tubular part of the retainer portion 134 to prevent complete separation of the lid part 146 from the retainer portion 134. The tubular part of the retainer portion 134 has a cord recess 152 formed adjacent the open free end thereof.

The cord recess 152 is designed to receive the cord or wire 125a therethrough after winding the cord 125a around the winding surface 136. The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An electric device for a bicycle comprising:
   a housing portion including a member configured to be electrically coupled to an electrical cord and a bicycle clamping portion configured to be mounted on the bicycle;
   a bobbin portion extending from the housing portion, said bobbin portion having a winding surface; and
   a retainer portion coupled to overlie a portion of said bobbin portion to retain the electrical cord on said winding surface of said bobbin portion.

2. The electric device according to claim 1, wherein said retainer portion includes a tubular part that encircles said winding surface of said bobbin portion.

3. The electric device according to claim 1, wherein said bobbin portion includes a pair of-bobbin sections spaced from each other to form a cord receiving space therebetween, each of said bobbin sections having a portion of said winding surface formed thereon.

4. The electric device according to claim 1, wherein said bobbin portion includes a tubular bobbin section having an external surface with said winding surface formed thereon.

5. The electric device according to claim 4, wherein said housing portion has a cord opening located between said tubular bobbin section and said retainer portion.

6. The electric device according to claim 1, wherein said bobbin portion has a first fastening part that mates with a second fastening part of said retainer portion to releasable couple said retainer portion to said bobbin portion.

7. The electric device according to claim 6, wherein said retainer portion includes a tubular part that is a separate member from said bobbin portion.

8. The electric device according to claim 7, wherein said tubular part of said retainer portion has a first open end and a second open end with said first and second fastening parts forming a snap-fit connection therebetween.

9. The electric device according to claim 8, wherein said bobbin portion has a fixed end coupled to said housing portion and a free end with said first fastening part formed thereon.

10. The electric device according to claim 9, wherein said second fastening part of said retainer portion includes an engagement surface located adjacent said second open end of said tubular part and said first fastening part of said bobbin portion includes at least one hook that engages said engagement surface of said tubular part.

11. The electric device according to claim 9, wherein said second fastening part of said retainer portion includes an engagement surface located adjacent said second open end of said tubular part and said first fastening part of said bobbin portion includes a pair of hooks that engage said engagement surface of said tubular part.

12. The electric device according to claim 11, wherein said bobbin portion includes a pair of bobbin sections spaced from each other to form a cord receiving space therebetween, each of said bobbin sections having one of said hooks.

13. The electric device according to claim 8, wherein said tubular part of said retainer portion has a cord recess,formed adjacent said first open end of said tubular part.

14. The electric device according to claim 1, wherein said retainer portion includes a tubular part and a lid part releasable coupled to said tubular part.

15. The electric device according to claim 14, wherein a latch is formed between said lid part of said retainer portion and an open free end of said tubular part of said retainer portion.

16. The electric device according to claim 15, wherein a hinge is formed between said lid part of said retainer portion and said tubular part of said retainer portion to prevent complete separation of said lid part from said tubular part.

17. An electric device for a bicycle comprising:

a housing portion;

a bobbin portion extending from the housing portion, said bobbin portion having a winding surface and including a pair of bobbin sections spaced from each other to form a cord receiving space therebetween, each of said bobbin sections having a portion of said winding surface formed thereon; and a retainer portion coupled to overlie a portion of said bobbin portion to retain an electrical cord on said winding surface of said bobbin portion, said housing portion having a cord opening located between said pair of bobbin sections and substantially aligned with said cord receiving space.

18. The electric device according to claim 17, wherein each of said bobbin sections includes an abutment surface adapted to engage part of a cord.

19. An electric device for a bicycle comprising:

a housing portion;

a bobbin portion extending from the housing portion, said bobbin portion having a winding surface; and a retainer portion coupled to overlie a portion of said bobbin portion to retain an electrical cord on said winding surface of said bobbin portion, said bobbin portion having a first fastening part that mates with a second fastening part of said retainer portion to releasable couple said retainer portion to said bobbin portion, said bobbin portion having a fixed end coupled to said housing portion and a free end with said first fastening part formed thereon, said retainer portion including a tubular part that is a separate member from said bobbin portion, said tubular part of said retainer portion having a first open end and a second open end with said first and second fastening parts forming a snap-fit connection therebetween, said second fastening part of said retainer portion including an engagement surface located adjacent said second open end of said tubular part and said first fastening part of said bobbin portion including a pair of hooks that engage said engagement surface of said tubular part, said bobbin portion including a pair of bobbin sections spaced from each other to form a cord receiving space therebetween, each of said bobbin sections having one of said hooks, said housing portion having a cord opening located between said pair of bobbin sections and substantially aligned with said cord receiving space.

20. An electric device for a bicycle comprising:

a housing portion;

a bobbin portion extending from the housing portion, said bobbin portion having a winding surface; and a retainer portion coupled to overlie a portion of said bobbin portion to retain an electrical cord on said winding surface of said bobbin portion, said bobbin portion having a first fastening part that mates with a second fastening part of said retainer portion to releasable couple said retainer portion to said bobbin portion, said retainer portion including a tubular part that is a separate member from said bobbin portion, said tubular part of said retainer portion having a first open end and a second open end with said first and second fastening parts forming a snap-fit connection therebetween, said tubular part of said retainer portion having a first alignment member and one of said bobbin portion and said housing portion having a second alignment member.

21. The electric device according to claim 20, wherein said first alignment member is a notch and said second alignment member is a projection that mates with said notch.

22. An electric device for a bicycle comprising:

a housing portion;

a bobbin portion extending from the housing portion, said bobbin portion having a winding surface; and a retainer portion coupled to overlie a portion of said bobbin portion to retain an electrical cord on said winding surface of said bobbin portion, said retainer portion including a tubular part and a lid part releasably coupled to said tubular part, a latch being formed between said lid part of said retainer portion and an open free end of said tubular part of said retainer portion, said tubular part having a cord recess formed adjacent said open free end of said tubular part, a hinge being formed between said lid part of said retainer portion and said tubular part of said retainer portion to prevent complete separation of said lid part from said tubular part.

23. The electric device according to claim 22, wherein said housing portion has a cord opening located between said winding surface of said bobbin portion and said tubular part of said retainer portion.

24. An electric device for a bicycle comprising:

a housing portion including a member configured to be electrically coupled to an electrical cord, said electric device being an electronic shifting device; and a cord retainer including a bobbin portion extending from said housing portion, said bobbin portion having a winding surface, said cord retainer being arranged and configured to retain the electrical cord on said winding surface of said bobbin portion.

25. The electric device according to claim 24, wherein said member including at least one shift button.

26. An electric device for a bicycle comprising:

a housing portion including a member configured to be electrically coupled to an electrical cord, said electric device being a cycle computer; and a cord retainer including a bobbin portion extending from said housing portion, said bobbin portion having a winding surface, said cord retainer being arranged and configured to retain the electrical cord on said winding surface of said bobbin portion.

27. The electric device according to claim 26, further comprising:

a display device.

28. The electric device according to claim 26, further comprising:

at least one control button.

* * * * *